(12) United States Patent
Mizuno

(10) Patent No.: US 11,495,943 B2
(45) Date of Patent: Nov. 8, 2022

(54) BUS BAR PROTECTOR

(71) Applicant: Yazaki Corporation, Tokyo (JP)

(72) Inventor: Takahiro Mizuno, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 218 days.

(21) Appl. No.: 17/074,875

(22) Filed: Oct. 20, 2020

(65) Prior Publication Data

US 2021/0126436 A1 Apr. 29, 2021

(30) Foreign Application Priority Data

Oct. 25, 2019 (JP) .............................. JP2019-194071

(51) Int. Cl.
*H02B 1/20* (2006.01)
*H01R 25/16* (2006.01)

(52) U.S. Cl.
CPC .............. *H02B 1/20* (2013.01); *H01R 25/162* (2013.01)

(58) Field of Classification Search
CPC .. H01R 13/502; H01R 13/506; H01R 25/162; H02B 1/20
See application file for complete search history.

(56) References Cited

U.S. PATENT DOCUMENTS

| 5,013,265 A * | 5/1991 | Buchter ............... H01R 25/162 439/744 |
| 10,468,841 B2 * | 11/2019 | Rangi ................... H01R 25/162 |
| 2019/0386282 A1 * | 12/2019 | Nakayama ............. H01G 11/82 |

FOREIGN PATENT DOCUMENTS

| CN | 107972607 A | 5/2018 |
| CN | 207819368 U | 9/2018 |
| CN | 109285633 A | 1/2019 |
| JP | 2013-041706 A | 2/2013 |

* cited by examiner

*Primary Examiner* — Oscar C Jimenez
*Assistant Examiner* — Paul D Baillargeon
(74) *Attorney, Agent, or Firm* — Sughrue Mion, PLLC

(57) ABSTRACT

A bus bar protector is configured to cover a bus bar having a flat plate portion and a standing portion standing from an end of the flat plate portion, and includes a first cover that covers one face of the bus bar and a second cover that covers another face of the bus bar. The first cover includes a first flat plate cover that covers the flat plate portion of the bus bar, and a first standing cover that covers the standing portion of the bus bar. The second cover includes a second flat plate cover that covers the flat plate portion of the bus bar, and a second standing cover that covers the standing portion of the bus bar. The first standing cover includes a pair of engagement pieces arranged to project toward the second standing cover and bent toward each other to engage with the second standing cover.

7 Claims, 3 Drawing Sheets

BUS BAR PROTECTOR

TECHNICAL FIELD

The present invention relates to a bus bar protector.

BACKGROUND

As a conventional electrical connecting member for providing electrical connection between a plurality of terminals, Patent Document 1 discloses an electrical connecting member provided with a bus bar having a linearly extending linear portion and a standing portion standing from the linear portion, and a two-piece cover configured to cover the bus bar.

One cover of the two-piece cover includes a receiving cover portion that covers one side of the standing portion of the bus bar, and another cover of the two-piece cover includes a holding cover portion that covers the other side of the standing portion of the bus bar. The receiving cover portion includes a pair of extending walls extending toward the holding cover portion, and the holding cover portion includes a pair of slide-contact walls that is capable of slide-contacting respective inner faces of the pair of extending walls. The respective slide-contact walls are slide-contacted with the respective extending walls, thereby maintaining a covered state in which the standing portion of the bus bar is covered between the receiving cover portion and the holding cover portion.

PRIOR ART DOCUMENT

Patent Document

Patent Document 1: JP 2013-41706 A

SUMMARY OF THE INVENTION

Problem to be Solved by the Invention

In the conventional electrical connecting member, however, the two-piece cover maintains the covered state of the standing portion of the bus bar only by the slide contact between the respective slide-contact walls and the respective extending walls. Thus, the two-piece cover could be opened due to application of outer force such as vibration and impact on a vehicle.

In view of the above-described problem, an object of the present invention is to provide a bus bar protector that maintains an engaged state in which a first cover is engaged with a second cover and that thereby achieves improved insulation reliability with respect to surrounding components.

Solution to Problem

In order to achieve the above-described object, the present invention provides, in one aspect, a bus bar protector configured to cover a bus bar having a flat plate portion and a standing portion standing from an end of the flat plate portion, including a first cover configured to cover one face of the bus bar; and a second cover configured to cover another face of the bus bar, wherein the first cover includes a first flat plate cover configured to cover the flat plate portion of the bus bar, and a first standing cover configured to cover the standing portion of the bus bar, the second cover includes a second flat plate cover configured to cover the flat plate portion of the bus bar, and a second standing cover configured to cover the standing portion of the bus bar, and the first standing cover includes a pair of engagement pieces arranged to project toward the second standing cover and bent toward each other to engage with the second standing cover.

In another aspect, the bus bar protector further includes a lock portion projecting from one of the first cover and the second cover and engageable with another one of the first cover and the second cover.

In another aspect, the pair of engagement pieces is capable of sliding with respect to the second standing cover in a standing direction of the standing portion of the bus bar, the lock portion is configured to engage in the sliding direction, and a length of the pair of engagement pieces in the sliding direction is longer than an engagement length of the lock portion in the sliding direction.

In another aspect, the first cover is provided with a pair of cover walls arranged to extend toward the second cover for covering side faces of the second cover.

Advantageous Effect of the Invention

According to the present invention described above, the first standing cover includes the pair of engagement pieces arranged to project toward the second standing cover and bent toward each other to engage with the second standing cover. Thus, when the pair of engagement pieces is moved closer to the second standing cover and the second standing cover is inserted between the pair of engagement pieces, the pair of engagement pieces is engaged with the second standing cover, thereby the first standing cover and the second standing cover are restricted from being moved in the direction away from the standing portion of the bus bar (i.e., an opening direction). Consequently, the bus bar protector can achieve improved insulation reliability with respect to surrounding components.

DETAILED DESCRIPTION OF THE EXEMPLARY EMBODIMENTS

Figure 1:
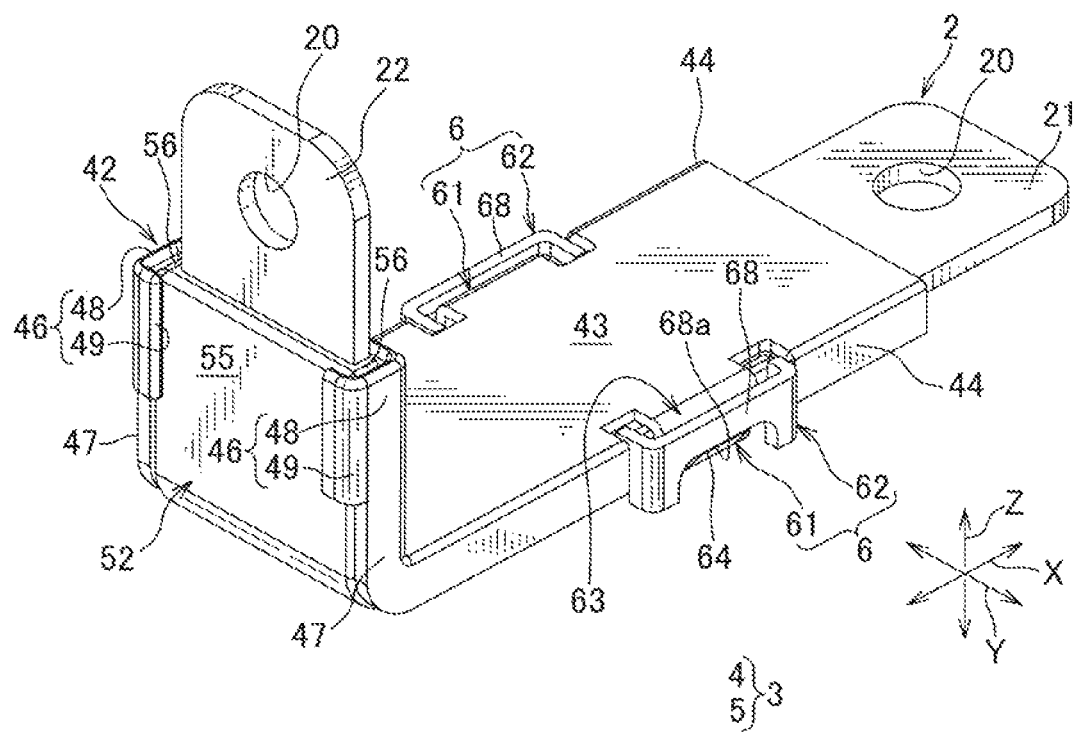
FIG. 1 is a perspective view showing a bus bar protector according to one embodiment of the present invention.

In the following, an embodiment of the present invention will be explained with reference to FIG. 1 through FIG. 4. FIG. 1 is a perspective view showing a bus bar protector according to one embodiment of the present invention. A bus bar protector 1 according to this embodiment is, for example, configured to be mounted on a vehicle (not shown) such as an electric vehicle and a hybrid vehicle and used for a battery module (not shown) used as a power source for driving the vehicle. This bus bar protector 1 may be used for connecting the battery modules to each other, or for connecting single cell batteries included in one battery module to each other.

Figure 2:
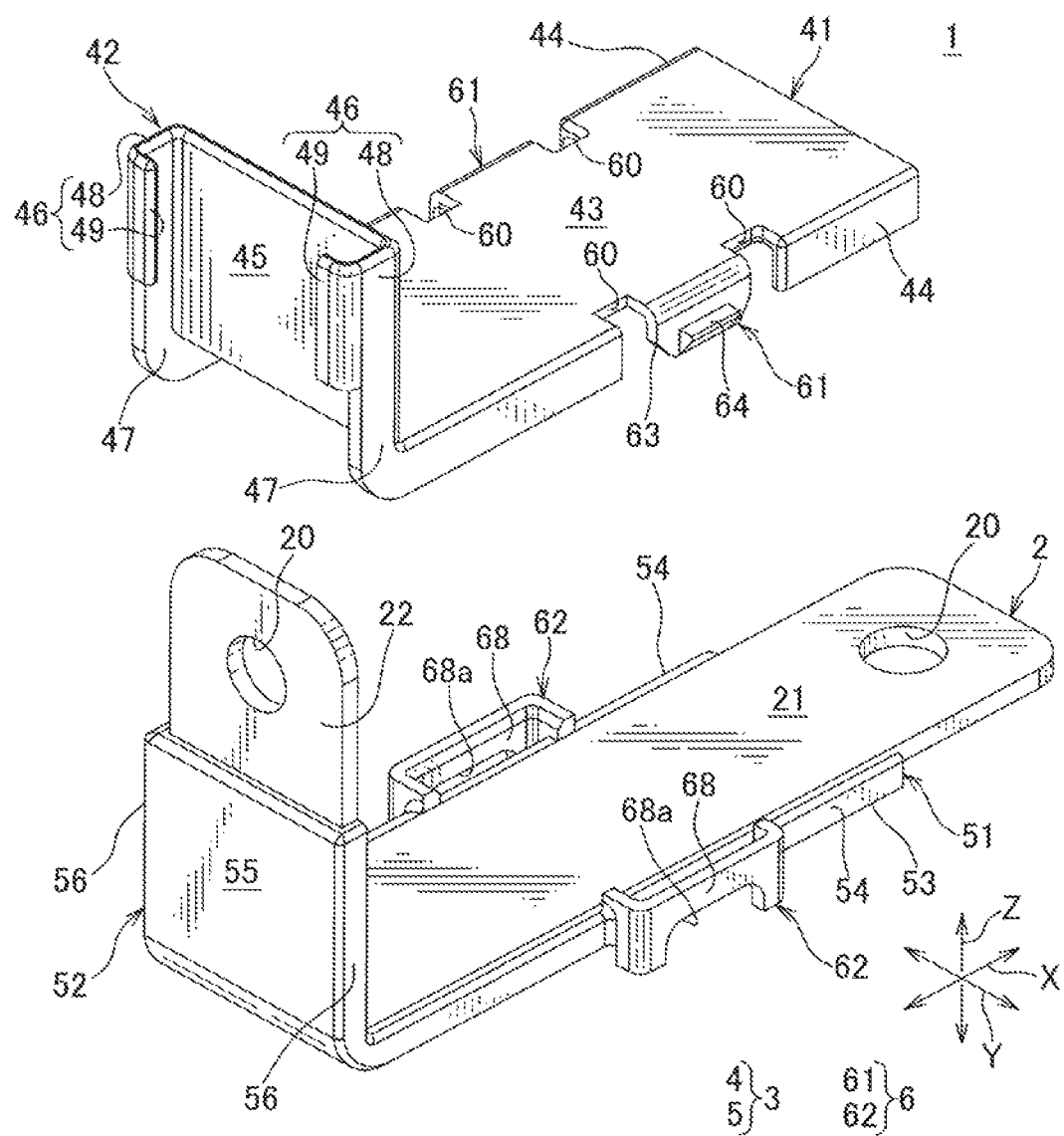
FIG. 2 is an exploded perspective view showing the bus bar protector.

As shown in FIG. 2, the bus bar protector 1 includes a bus bar 2 and a cover 3 that is attached to the bus bar 2 to cover the bus bar 2.

The bus bar 2 is formed by punching and bending a metal plate. The bus bar 2 is formed into an L-like shape with a rectangular flat plate portion 21 and a standing portion 22 standing from an end of the flat plate portion 21. Through holes 20 configured to pass bolts and such therethrough are provided on both ends of the bus bar 2 located in a continuing direction of the bus bar 2. The pair of through holes 20 is exposed when the bus bar 2 is covered with the cover 3. As shown in FIG. 1, the flat plate portion 21 of the bus bar 2 is installed such that its long side is arranged in a X direction, its short side is arranged in a Y direction, and its plate thickness direction is arranged in a Z direction. The standing portion 22 is installed such that its standing direction corresponds to the Z direction. Herein, one side in the Z direction may be referred to as "upper side" and the other side in the Z direction may be referred to as "lower side".

The cover 3 is constituted of a first cover 4 (one cover) configured to cover one face of the bus bar 2, a second cover 5 (another cover) configured to cover another face of the bus bar 2, and a lock portion 6 arranged to project from the first cover 4 toward the second cover 5 and engageable with the second cover 5. Although the lock portion 6 in this embodiment is arranged to project from the first cover 4 toward the second cover 5 and engageable with the second cover 5, the present invention is not limited to this. The lock portion may be arranged to project from the second cover 5 toward the first cover 4 and engageable with the first cover 4.

As shown in FIG. 2, the first cover 4 includes a first flat plate cover 41 configured to cover the flat plate portion 21 of the bus bar 2, and a first standing cover 42 continued from the first flat plate cover 41 and configured to cover the standing portion 22 of the bus bar 2.

As shown in FIG. 2, the first flat plate cover 41 includes a plate-shaped first flat plate 43 extending in the X and Y directions, and a pair of first side plates 44, 44 (pair of cover walls) standing from both edges of the first flat plate 43 located in the Y direction and extending in the Z direction. The first flat plate 43 is arranged to cover the one face of the flat plate portion 21 of the bus bar 2. The pair of first side plates 44, 44 is arranged to cover a later-described respective second side plates 54 (side faces) of the second cover 5. In addition, a later-described first lock 61 of the lock portion 6 is provided at an intermediate portion in a longitudinal direction (i.e., the X direction) of the first flat plate cover 41.

As shown in FIG. 2, the first standing cover 42 includes a plate-shaped first standing portion 45 extending in the Z and Y directions, a pair of engagement pieces 46, 46 arranged to project toward a later-described second standing cover 52 and engage with this second standing cover 52, and a pair of first continuous plates 47, 47 continued to the first side plates 44 of the first flat plate cover 41.

The first standing portion 45 is arranged to cover a face of the standing portion 22 of the bus bar 2 that is continuing from the one face of the flat plate portion 21.

Figure 4:
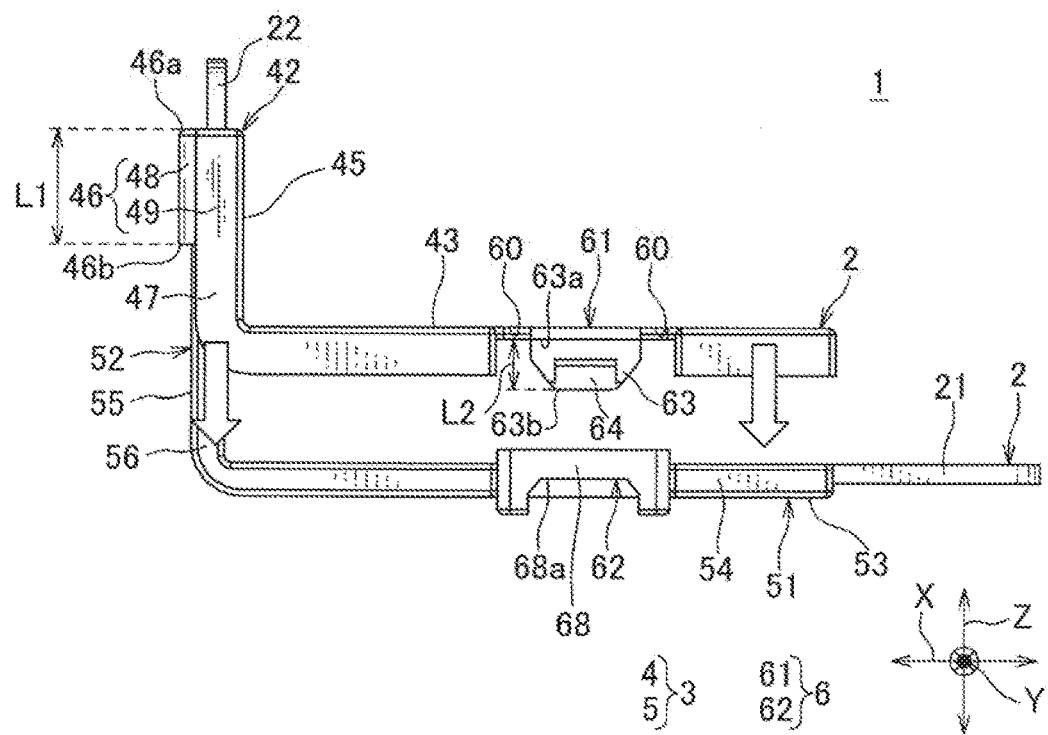
FIG. 4 is a side view illustrating how the bus bar protector is assembled and illustrating how a first cover and a second cover which constitute the bus bar protector are assembled together.

As shown in FIG. 2 and FIG. 4, the pair of engagement pieces 46, 46 includes a pair of sandwiching plates 48, 48 configured to sandwich the second standing cover 52 in the Y direction, and a pair of bent pieces 49, 49 provided on tips of the pair of sandwiching plates 48, 48 and extending toward each other. The pair of engagement pieces 46, 46 is slidable in the same direction as the standing direction (i.e., the Z direction) of the standing portion 22 of the bus bar 2. The pair of engagement pieces 46, 46 is formed such that a direction of removal of a molding die thereof is the same as a direction of removal of a molding die used for forming the first cover 4. The pair of engagement pieces 46, 46 is formed continuously from an upper end in the Z direction of the first standing portion 45 to an intermediate portion of the first standing portion 45.

The pair of sandwiching plates 48, 48 is arranged to stand (project) from both ends of the first standing portion 45 located in the Y direction and extend toward the second standing cover 52 to sandwich the second standing cover 52 in the Y direction. The pair of bent pieces 49, 49 is arranged to sandwich the second standing cover 52 in the X direction.

Figure 3:
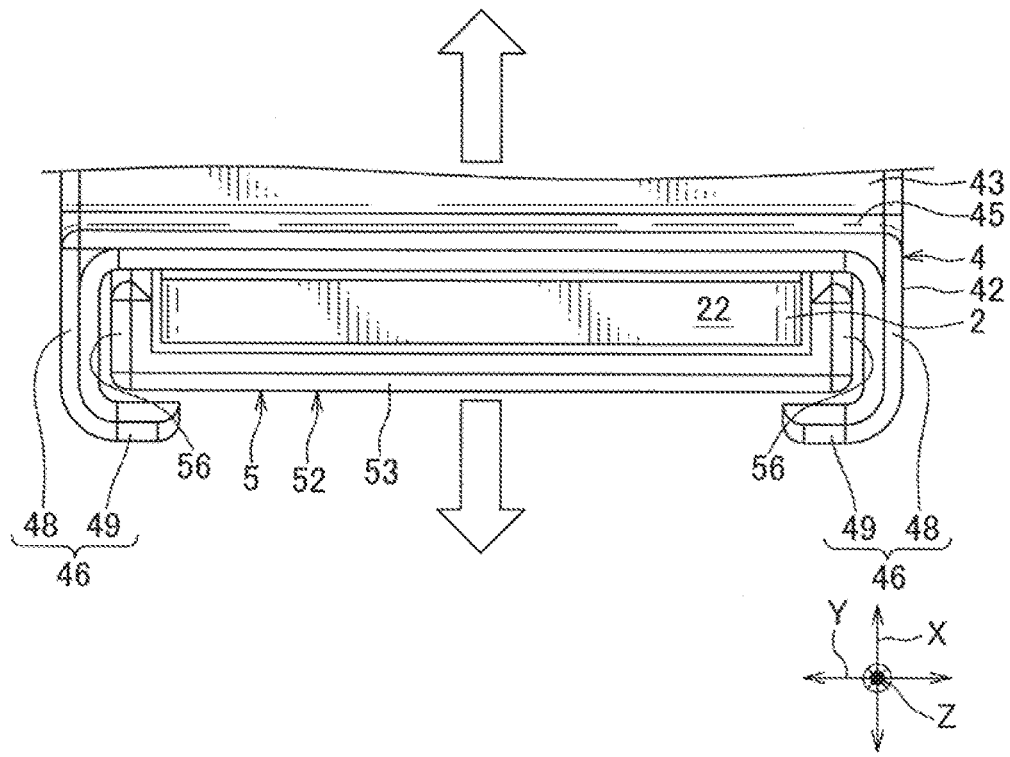
FIG. 3 is a top view of the bus bar protector.

As shown in FIG. 3, the pair of engagement pieces 46, 46 as described above is slidable in the Z direction (i.e., the standing direction of the standing portion 22) with respect to the second standing cover 52 in a state where the second standing cover 52 is sandwiched by the pair of sandwiching plates 48, 48 in the Y direction and is sandwiched by the pair of bent pieces 49, 49 in the X direction. This state where the second standing cover 52 is sandwiched by the pair of sandwiching plates 48, 48 in the Y direction and is sandwiched by the pair of bent pieces 49, 49 in the X direction, is expressed herein as "the pair of engagement pieces 46, 46 is engaged with the second standing cover 52". With the pair of engagement pieces 46, 46 engaged with the second standing cover 52, the first standing cover 42 and the second standing cover 52 are restricted from being moved in a direction away from the standing portion 22 of the bus bar 2 (i.e., an opening direction X).

The pair of first continuous plates 47, 47 is provided between each first side plate 44 and each sandwiching plate 48 of the pair of engagement pieces 46, 46, and is continuous with each first side plate 44 and each sandwiching plate 48. Each first continuous plate 47 and each sandwiching plate 48 cover each second continuous plate 56 of the second cover 5.

As shown in FIG. 2, the second cover 5 includes a second flat plate cover 51 configured to cover the flat plate portion 21 of the bus bar 2, and the second standing cover 52 continued from the second flat plate cover 51 and configured to cover the standing portion 22 of the bus bar 2. The second flat plate cover 51 is configured to cover the flat plate portion 21 of the bus bar 2 with the flat plate portion 21 placed between the second flat plate cover 51 and the first flat plate cover 41 of the first cover 4. The second standing cover 52 is configured to cover the standing portion 22 of the bus bar 2 with the standing portion 22 placed between the second standing cover 52 and the first standing cover 42 of the first cover 4.

As shown in FIG. 2, the second flat plate cover 51 includes a plate-shaped second flat plate 53 extending in the X and Y directions, and the pair of second side plates 54, 54 (side faces of the second cover) extending in the Z direction from both edges of the second flat plate 53 located in the Y direction. The second flat plate 53 is arranged to cover the other face of the flat plate portion 21 of the bus bar 2. In a state where the flat plate portion 21 of the bus bar 2 is accommodated within the second flat plate cover 51, the pair of second side plates 54, 54 covers the respective end faces of the flat plate portion 21, with an upper end in the Z direction of each second side plate 54 being at substantially the same position with the upper face of the flat plate portion 21. In addition, a second lock 62 engageable with the first lock 61 of the lock portion 6 is provided at an intermediate portion in the longitudinal direction (X direction) of the second flat plate cover 51.

As shown in FIG. 2, the second standing cover 52 includes a plate-shaped second standing portion 55 extending in the Z and Y directions, and the pair of second continuous plates 56, 56 continued from the respective second side plates 54 of the second flat plate cover 51. The second standing portion 55 is arranged to cover a face of the standing portion of the bus bar 2 that is continued from the other face of the flat plate portion 21.

As shown in FIG. 2, the lock portion 6 includes the first lock 61 provided at the first flat plate cover 41 of the first cover 4, and the second lock 62 provided at the second flat plate cover 51 of the second cover 5 and engageable with the first lock 61. A direction of engagement of the first lock 61 with the second lock 62 is the same direction as the standing direction of the standing portion 22 of the bus bar 2 (i.e., the Z direction).

As shown in FIG. 2, the first lock 61 is provide in a pair at both ends of the first flat plate cover 41 located in the Y direction and at an intermediate portion in the X direction of the first flat plate cover 41. Each first lock 61 is arranged to be elastically deformable by cutting out a portion of the first flat plate 43 and the first side wall 44, and cutouts 60 are thereby formed on both sides of the first lock 61 located in the X direction. The first lock 61 includes an arm portion 63 and a lock protrusion 64 formed on an outer face of the arm portion 63. The lock protrusion 64 is provided at a tip of the arm portion 63.

As shown in FIG. 2, the second lock 62 is provided in a pair at both ends of the second flat plate cover 51 located in the Y direction and at an intermediate portion in the X direction of the second flat plate cover 51. Each second lock 62 is projecting in the Y direction from each second side plate 54 and is formed into a C-like shape so that the first lock 61 can be inserted therein. Each second lock 62 is provide with an abutment wall 68 having an engagement portion 68a with which the lock protrusion 64 engages when the first lock 61 is inserted.

When the first lock 61 as described above is to engage with the second lock 62, firstly the first lock 61 is moved in the Z direction toward the second lock 62, and the lock protrusion 64 abuts on the abutment wall 68. Then, by further moving the first lock 61 toward the second lock 62, the arm portion 63 is elastically deformed and the lock protrusion 64 is positioned inside the abutment wall 68, and the lock protrusion 64 gets over the abutment wall 68 and abuts on the engagement portion 68a of the abutment wall 68. In this manner, the first lock 61 is fitted into and engaged with the second lock 62. As a result, the first cover 4 is restricted from moving in the Z direction with respect to the second cover 5.

Referring now to FIG. 4, a length L1 of the pair of engagement pieces 46 from one end 46a to another end 46b (i.e., a length of the pair of engagement pieces 46, 46 in the sliding direction) is arranged longer than an engagement length L2 of the lock portion 6 in the Z direction (i.e., a Z direction length of the arm portion 63 from a base 63a to a tip 63b). Thus, firstly the pair of engagement pieces 46, 46 engages with the second standing cover 52, and then the pair of engagement pieces 46, 46 slides while in this engaged state and the first lock 61 engages with the second lock 62. That is, prior to the engagement of the first lock 61 with the second lock 62, the pair of engagement pieces 46, 46 engages with the second standing cover 52.

In the following, an assembling procedure of the bus bar protector 1 configured as described above is explained with reference to FIG. 2 and FIG. 4.

Firstly, as shown in FIG. 2, the flat plate portion 21 of the bus bar 2 is disposed on the second flat plate cover 51, and the standing portion 22 of the bus bar 2 is disposed on the second standing cover 52.

Next, as shown in FIG. 4, the pair of engagement pieces 46, 46 is moved closer to the second standing cover 52, and the second standing cover 52 is inserted between the pair of engagement pieces 46, 46. At this point, the second standing cover 52 is sandwiched in the Y direction by the pair of sandwiching plates 48, 48 of the pair of engagement pieces 46, 46, while being sandwiched in the X direction by the pair of bent pieces 49, 49 of the pair of engagement pieces 46, 46. That is, the pair of engagement pieces 46, 46 is engaged with the second standing cover 52. As a result, the first standing cover 42 and the second standing cover 52 are restricted from being moved in the direction away from the standing portion 22 of the bus bar 2 (i.e., the opening direction X), and the first cover 4 is positioned with respect to the second cover 5 in the X and Y directions.

As the first cover 4 is further moved closer to the second cover 5, the lock protrusion 64 of the first lock 61 contacts the second lock 62. Then, as the first cover 4 is further moved closer to the second cover 5, the arm portion 63 is elastically deformed, and the lock protrusion 64 is moved over the abutment wall 68 and abuts on the engagement portion 68a of the abutment wall 68. Consequently, the first lock 61 is engaged with the second lock 62. In this way, the bus bar protector 1 is completed.

According to the bus bar protector 1 configured as described above, the first standing cover 42 is provided with the pair of engagement pieces 46, 46 arranged to project toward the second standing cover 52 and bent toward each other to engage with the second standing cover 52. That is, when the pair of engagement pieces 46, 46 is moved closer to the second standing cover 52 and the second standing cover 52 is inserted between the pair of engagement pieces 46, 46, the pair of engagement pieces 46, 46 is engaged with the second standing cover 52, thereby the first standing cover 42 and the second standing cover 52 are restricted from being moved in the direction away from the standing portion 22 of the bus bar 2 (i.e., the opening direction X). In addition, even if the second standing cover 52 is slanted inward due to warping, the first standing cover 42 and the second standing cover 52 are kept restricted from moving in the direction away from the standing portion 22 of the bus bar 2 (i.e., the opening direction X) since the pair of engagement pieces 46, 46 is engaged with the second standing cover 52. Consequently, insulation reliability with respect to surrounding components can be improved.

Further, the bus bar protector 1 includes the lock portion 6 projecting from the first cover 4 (one of the first cover 4 and the second cover 5) and engageable with the second cover 2 (another one of the first cover 4 and the second cover 5). Thus, the first cover 4 and the second cover 5 are locked together by the lock portion 6, and thereby the first standing cover 42 is restricted from moving with respect to the second standing cover 52 in the standing direction of the standing portion 22 of the bus bar 2 (i.e., the sliding direction Z). Consequently, the engaged state in which the first cover 4 is engaged with the second cover 5 can be maintained even more firmly.

Further, the pair of engagement pieces 46, 46 is provided so as to be slidable in the standing direction Z of the standing portion 22 while being engaged with the second standing cover 52, and the lock portion 6 is arranged engageable in the sliding direction Z. That is, the sliding direction of the pair of engagement pieces 46, 46 is the same as the engaging direction Z of the lock portion 6. In addition, when attaching the first cover 4 to the second cover 5, firstly the pair of engagement pieces 46, 46 is engaged with the second standing cover 52 and the first cover 4 is positioned with respect to the second cover 5, and after that the lock portion 6 is engaged. Thus, the positioning of the lock portion 6 is not required since the pair of engagement pieces 46, 46 is engaged with the second standing cover 52, and hence the lock portion 6 can be engaged without lowering the assembling workability.

Furthermore, since the first cover 4 is provided with the pair of cover walls 44 extending toward the second cover 5 to cover the side faces 54, 54 of the second cover 5, contact of a finger with the bus bar 2 can be prevented, thereby providing improved insulation reliability with respect to surrounding components.

Preferred configuration and method and such for implementing the present invention have been described above; however, the present invention is not limited to this. That is, although the present invention has been specifically shown and described mainly with respect to specific embodiments, a person skilled in the art can make various modifications to those embodiments described above in terms of shape, material, number and/or other detailed configurations without departing from the scope of technical idea and an object of the present invention. Thus, since the description specifying shape, material and such disclosed herein is for the illustrative purpose only in order to enhance understanding of the present invention and is not intended to limit the present invention, description using name of a member without such limitation, either entire limitation or a part of limitation, regarding shape, material and such, is also within the present invention.

LIST OF REFERENCE SIGNS 1 bus bar protector
2 bus bar
21 flat plate portion
22 standing portion
4 first cover
41 first flat plate cover
42 first standing cover
44, 44 pair of first side plates (pair of cover walls)
46, 46 pair of engagement pieces
5 second cover
51 second flat plate cover
52 second standing cover
54, 54 pair of second side plates (side faces of the second cover)
6 lock portion
Z standing direction, sliding direction
L1 a length in a sliding direction of the pair of engagement pieces
L2 an engagement length of the lock portion

What is claimed is:

1. A bus bar protector configured to cover a bus bar having a flat plate portion and a standing portion standing from an end of the flat plate portion, comprising:
    a first cover configured to cover one face of the bus bar; and
    a second cover configured to cover another face of the bus bar, wherein
    the first cover includes a first flat plate cover configured to directly cover the flat plate portion of the bus bar, and a first standing cover configured to directly cover the standing portion of the bus bar,
    the second cover includes a second flat plate cover configured to directly cover the flat plate portion of the bus bar, and a second standing cover configured to directly cover the standing portion of the bus bar, and
    the first standing cover includes a pair of engagement pieces arranged to project toward the second standing cover and bent toward each other to engage with the second standing cover.

2. The bus bar protector as claimed in claim 1, further comprising a lock portion projecting from one of the first cover and the second cover and engageable with another one of the first cover and the second cover.

3. The bus bar protector as claimed in claim 2, wherein
    the pair of engagement pieces is slidable with respect to the second standing cover in a standing direction of the standing portion of the bus bar,
    the lock portion is configured to engage in the sliding direction, and
    a length of the pair of engagement pieces in the sliding direction is longer than an engagement length of the lock portion in the sliding direction.

4. The bus bar protector as claimed in claim 3, wherein the first cover is provided with a pair of cover walls arranged to extend toward the second cover to cover side faces of the second cover.

5. The bus bar protector as claimed in claim 2, wherein the first cover is provided with a pair of cover walls arranged to extend toward the second cover to cover side faces of the second cover.

6. The bus bar protector as claimed in claim 1, wherein the first cover is provided with a pair of cover walls arranged to extend toward the second cover to cover side faces of the second cover.

7. The bus bar protector as claimed in claim 1, wherein the first standing cover extends from an end of the first flat plate cover perpendicularly with respect to the first flat plate cover, and the second standing cover extends from an end of the second flat plate cover perpendicularly with respect to the second flat plate cover.

* * * * *